United States Patent [19]

Gardell et al.

[11] Patent Number: 6,128,304
[45] Date of Patent: Oct. 3, 2000

[54] NETWORK PRESENCE FOR A COMMUNICATIONS SYSTEM OPERATING OVER A COMPUTER NETWORK

[75] Inventors: Steven E. Gardell, North Andover; Barbara Mayne Kelly, Concord; Rajiv Bhatnagar, Acton; Thomas James Antell, Westford; Israel B. Zibman, Newton, all of Mass.

[73] Assignee: GTE Laboratories Incorporated, Waltham, Mass.

[21] Appl. No.: 09/178,130

[22] Filed: Oct. 23, 1998

[51] Int. Cl.$^7$ .................................................. H04M 1/64
[52] U.S. Cl. ........................... 370/401; 370/260; 370/352; 379/202
[58] Field of Search .................................... 370/259, 260, 370/261, 270, 352, 355, 356, 401; 379/201, 202, 211, 212

[56] References Cited

U.S. PATENT DOCUMENTS 5,768,346  12/1999  Spruijt ..................................... 379/352
5,999,525  12/1999  Krishnaswamy et al. ............... 370/352

FOREIGN PATENT DOCUMENTS

WO 98/17048  4/1998  WIPO.

OTHER PUBLICATIONS

Thom, "H.323: The Multimedia Communications Standard for Local Area Network", IEEE, pp. 52–56, Dec. 1996.
Labriola, Don, "Here's Looking at You," Computer Shopper, Sep. 1997, pp. 335–362.
Kahane, Opher et al., Call Management Agent System: Requirements, Function, Architecture and Protocol, IMTC VoIP Forum Contribution, Jan. 15, 1997, 44 pages.

*Primary Examiner*—Chi H. Pham
*Assistant Examiner*—Frank Duong
*Attorney, Agent, or Firm*—Leonard Charles Suchyta; Floyd E. Anderson

[57] ABSTRACT

A method and apparatus are implemented for providing traditional telecommunications service capabilities in a packet based computer network. The system and method of the present invention automatically provide such service capabilities in the event a terminal end-point is unavailable to receive an incoming call, based upon predetermined associations between the terminal end-point and one or more of the available services.

21 Claims, 6 Drawing Sheets

NETWORK PRESENCE FOR A COMMUNICATIONS SYSTEM OPERATING OVER A COMPUTER NETWORK

RELATED APPLICATIONS FILED CONCURRENTLY HEREWITH

This invention is related to the following inventions, all of which are filed concurrently herewith and assigned to the assignee of the rights in the present invention: Ser. No. 60/105,326 of Gardell et al. entitled "A HIGH SPEED COMMUNICATIONS SYSTEM OPERATING OVER A COMPUTER NETWORK"; Ser. No. 09/177,712 of Gardell et al. entitled "MULTI-LINE TELEPHONY VIA NETWORK GATEWAYS"; Ser. No. 09/178,271 of Gardell et al. entitled "SPEAKER IDENTIFIER FOR MULTI-PARTY CONFERENCE"; Ser. No. 09/178,178 of Gardell et al. entitled "SYSTEM PROVIDING INTEGRATED SERVICES OVER A COMPUTER NETWORK"; Ser. No. 09177,415 of Gardell et al. entitled "REAL-TIME VOICE-MAIL MONITORING AND CALL CONTROL"; Ser. No. 09/177,700 of Gardell et al. entitled "MULTI-LINE APPEARANCE TELEPHONY VIA A COMPUTER NETWORK"; and Ser. No. 09/177,712 of Gardell et al. entitled "MULTI-LINE TELEPHONY VIA NETWORK GATEWAYS".

BACKGROUND OF THE INVENTION

1. Field of the Invention

The present invention generally relates to the field of telecommunications. More specifically, the invention is directed to a method and apparatus for providing a network-based presence in an H.323-based communications system to handle one or more incoming calls and to provide various services in instances where the called parties are unavailable.

2. Description of the Related Art

H.323 is an International Telecommunications Union (ITU) standard that provides guidelines for terminals and equipment that provide multimedia communications services over packet-based computer networks (PBNs). H.323 terminals and equipment may carry real-time audio, video and/or data.

The packet based network over which H.323 terminals communicate may be a point-to-point connection, a single network segment, or an inter-network having, multiple segments with complex topologies, such as local area networks (LANs), Intra-Networks, and Inter-Networks, including the Internet.

H.323 terminals may be used in point-to-point, multi-point, or broadcast configurations (as described in H.332). They may interwork with H.310 terminals on B-ISDN, H.320 terminals on N-ISDN, H.321 terminals on B-ISDN, H.322 terminals on Guaranteed Quality of Service LANs, H.324 terminals on GSTN and wireless networks, V.70 terminals on GSTN, and voice terminals on GSTN or ISDN through the use of Gateways. H.323 terminals may be integrated into personal computers or implemented in stand-alone devices such as video telephones.

Computer networks which are capable of transmitting data or information between locations, such as the above-mentioned Internet, have been used to transmit audio information between computers without incorporating H.323-based communications systems. At the transmitting computer, a person's voice may be digitized using a conventional analog to digital (A/D) converter and transmitted to the receiving location where it is passed through a conventional digital to analog (D/A) converter and presented as audio. This type of audio connectivity is somewhat similar to flat rate telephony, in that audio information may be transmitted from one location to another by way of a high bandwidth, flat rate communications medium.

This type of computer telephony system suffers from several major disadvantages. First, the system is limited to only those people who have access to the Internet and who are using compatible end-point software. In addition, while Internet access has now widely proliferated, it has not reached the near universal accessibility of traditional telephone service over public switched telephone networks (PSTNs) and the like. Thus, such a computer telephony system is totally useless if a user on the Internet desires to communicate with someone who does not have access to the Internet.

On the other hand, an H.323-based communications system allows people on a computer network, such as the Internet, to communicate with people on a conventional telephone network, such as a PSTN, general switched telephone network (GSTN), integrated services digital network (ISDN), or other switched circuit network (SCN). Such a system provides the appropriate translation between SCN and PBN data formats and between different communication procedures, in order to allow a user on one system (such as the PSTN) to communicate with a user on an otherwise incompatible system (such as a packet based network).

While H.323-based communications systems effectively support communication between two otherwise incompatible networks, current use of those systems has been somewhat limited. Current systems are designed to support communication between two parties, and also provide for conferencing of multiple parties in a single call. However, H.323-based systems do not presently address the provision of more traditional phone behavior offered in PSTN and other conventional telecommunications networks. This is a significant drawback, especially for those who are already reluctant to convert from conventional telecommunications networks to an H.323-based system for their telecommunications needs.

As an example, one shortcoming associated with current H.323-based communications systems is that there is no procedure for connecting an incoming call with a network-based service such as voicemail when a called party's terminal is off-line. Existing H.323 systems provide services such as call forwarding and voice mail; however, these services are implemented solely at the terminal end-point being called. Thus, if the party's terminal is off-line, these services are simply unavailable, and the call cannot be completed.

Accordingly, there continues to be a need for a communications system that provides for communication between a packet based network (PBN) and a conventional switched circuit network (SCN), while simultaneously providing various services for handling an incoming call in the event the called party is unavailable, whether or not that party's terminal is on-line. The present invention addresses these needs and others.

SUMMARY OF THE INVENTION

According to the present invention, a novel system and method are described which provide various telecommunications service capabilities on a computer network in instances where the called party is unavailable, regardless of the status of the called party's terminal. The invention is operative to route such calls to various service nodes offering well known services, including traditional voice mail, personal assistant, and call forwarding services. The present invention is incorporated in a network-based system to support communication with conventional SCNs. The network-based system includes a gateway that provides for communication between two dissimilar networks, a signal routing agent that controls operation and transmits signals, and one or more service nodes to selectively receive incoming calls and provide various services.

Thus, the present invention in one preferred embodiment is directed to a communication system for interacting with a switched circuit network and for establishing a network presence to, under predetermined conditions, provide network-based services for handling incoming calls directed to a terminal end-point, the system comprising: a gateway in communication with the switched circuit network, the gateway being operative to translate switched circuit network-compatible signals into computer network-compatible signals; a signal routing agent in communication with the gateway, with the terminal end-point, and with one or more network-resident service entities, the signal routing agent being operative to receive an incoming call from the gateway addressed to the terminal end-point and to transmit the incoming call to the terminal end-point; and a feature selector in communication with the signal routing agent, the feature selector being programmed to, under the predetermined conditions, determine a corresponding service entity for the terminal end-point being called and to transmit a corresponding signal to the signal routing agent, whereby the signal routing agent is responsive to receipt of the signal from the feature selector to route the incoming call to the corresponding service entity.

In another preferred embodiment, the present invention comprises: a call management database storing service information for one or more terminal end-points; a service feature selector programmed to access the call management database under predetermined conditions to determine an appropriate service node to receive an incoming call; and a signal routing agent in communication with the service feature selector and with the gateway, the signal routing agent being operative to receive incoming calls from a gateway and to route the incoming calls to the appropriate service nodes as directed by the service feature selector.

A preferred method of the present invention includes the steps of: receiving an incoming call addressed to a particular terminal end-point; determining whether the terminal end-point is available to receive the incoming call; if the terminal end-point is not available, determining an appropriate network-resident service node to receive the call; and routing the incoming call to the appropriate network-resident service node.

BRIEF DESCRIPTION OF THE DRAWINGS

Other objects, features and advantages of the invention discussed in the above summary of the invention will be more clearly understood when taken together with the following detailed description of preferred embodiments which will be understood as being illustrative only, and the accompanying drawings reflecting aspects of those embodiments, in which.

DETAILED DESCRIPTION OF THE PREFERRED EMBODIMENTS

Figure 1:
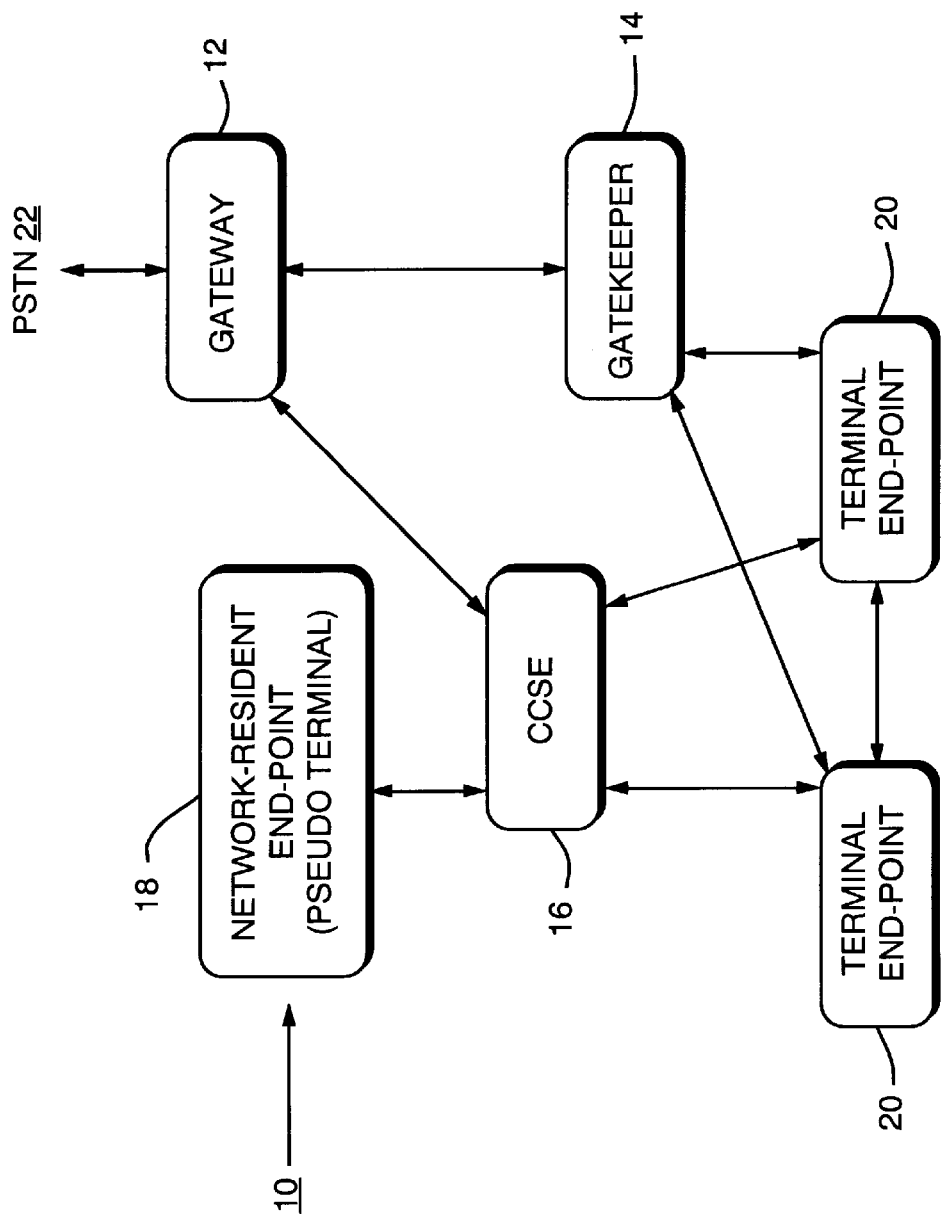
FIG. 1 is a block diagram of an H.323-based communications system comprising one preferred embodiment of the present invention.

In the following detailed description, like reference numerals will be used to refer to like or corresponding elements in the different figures of the drawings. Referring now to the drawings, and particularly to FIG. 1, there is shown an H.323-based network system 10 comprising a preferred embodiment of the invention. Generally, the network system includes a gateway 12, a gatekeeper 14, a signal routing device, for example a call control service entity 16 (CCSE), one or more network-resident service nodes 18, and plural terminal end-points 20. In the preferred embodiment, the network system 10 is operative to receive plural incoming calls from, for example, a public switched telephone network 22 (PSTN) that seek to establish communication with one or more of the terminal end-points, determine whether the terminal end-point or end-points are available and, if one or more of the end-points are unavailable, route the corresponding incoming calls to a preselected network-resident end-point 20.

The gateway 12 comprises an H.323-defined entity, and provides signal conversion capabilities between a switched public network, for example the PSTN 22, and the H.323-based network to support communication therebetween. The gateway also allows for interworking with other H-series terminals, GSTN or ISDN voice terminals, or GSTN or ISDN data terminals. The gateway is operative to accept a call originating on, for example, the PSTN 22, to convert the signal to an H.323-compatible format, and to pass it into the H.323 network. The gateway may also perform the opposite function, namely take a call originating in H.323, convert the signal to a PSTN-compatible format, and pass it on to the PSTN 22. The gateway is responsible for passing caller-ID data, number-dialed data, and other such information in both directions. Various telephony signaling technologies may be used by the gateway to perform these functions, as are well known to those of ordinary skill in the art.

The gatekeeper 14 is also an H.323-defined component that provides admissions control and address translation services. In addition, the gatekeeper may also be configured to provide call control services and route call control signals to the H.323 terminal end-points 20. The gatekeeper is in communication with the gateway, and initially receives a translated phone number dialed by a caller on the PSTN 22, such as an E.164 address, from the gateway. The gatekeeper accesses a translation table (not shown) to determine the corresponding IP address of the terminal end-point, and coordinates initial call presentation procedures, as described in greater detail below.

The gatekeeper 14 typically includes a server in the form of a computer or router that is dedicated to running the gatekeeper. The computer or router is programmed with software to provide H.323 specified gatekeeper functionality.

The CCSE 16 comprises a signal routing agent, and is responsible for attempting to connect a caller with a particular terminal end-point 20. The CCSE is signaled by the gatekeeper 14 with the address of the appropriate terminal end-point for receiving the call. The CCSE then routes a call setup signal to the terminal end-point, as is described in greater detail below. In place of the CCSE 16, a call routed gatekeeper could be used to provide the call control services for the network 10. In that event, the gatekeeper would process the call signaling itself and complete the call signaling with the terminal end-point or end-points.

Figure 2:
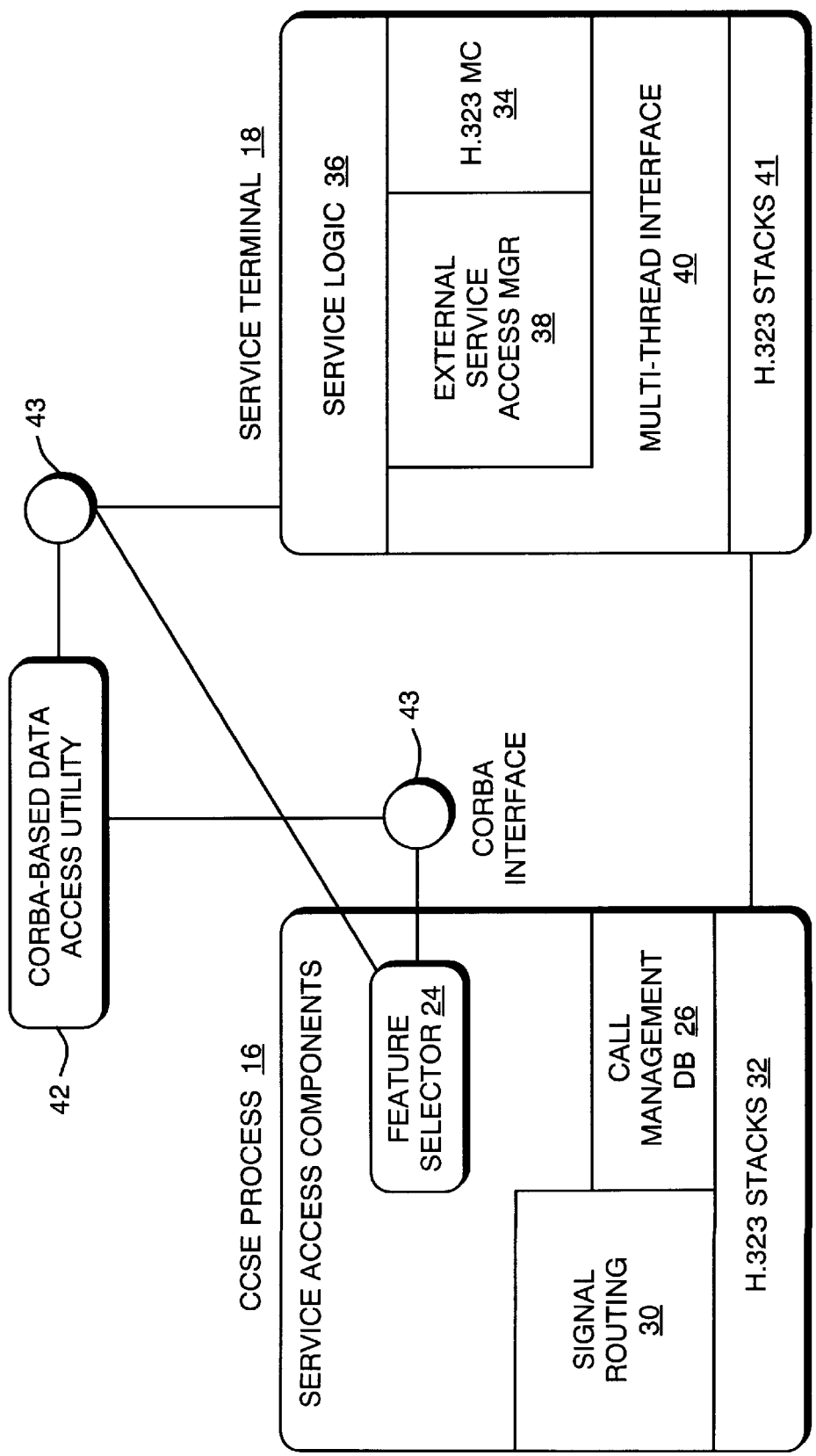
FIG. 2 is a block diagram showing a call control service entity and service node included in the system of FIG. 1.

Referring to FIG. 2, in one illustrative embodiment of the present invention, the CCSE 16 includes a feature selector 24, a call management database 26, a signal routing device 30, and H.323 stacks 32. In the event a called terminal end-point 20 is determined to be unavailable, the feature selector is programmed to access the call management database 26 to determine the proper end-point 20 to receive the incoming call, as is described in greater detail below. The signal routing device 30 is responsible for routing an incoming call received from the gateway to a corresponding terminal end-point 20, as is well known in the art.

While the feature selector 24 is shown in one preferred embodiment as being contained within the CCSE 16, it will be apparent that the feature selector can be a separate entity that is connected for two-way communication with the CCSE. The CCSE, after determining that a terminal end-point is unavailable, transmits a corresponding signal to the feature selector that identifies the terminal end-point being called and alerts the feature selector that the terminal end-point is unavailable. The feature selector then accesses the call management database 26, determines the appropriate end-point 20 to receive the call, and transmits a corresponding signal back to the CCSE with the appropriate output parameters such as the address of the end-point 20 to receive the call. This signaling between the CCSE and feature selector can be done through the use of call-backs, or any other similar manner.

Figure 3:
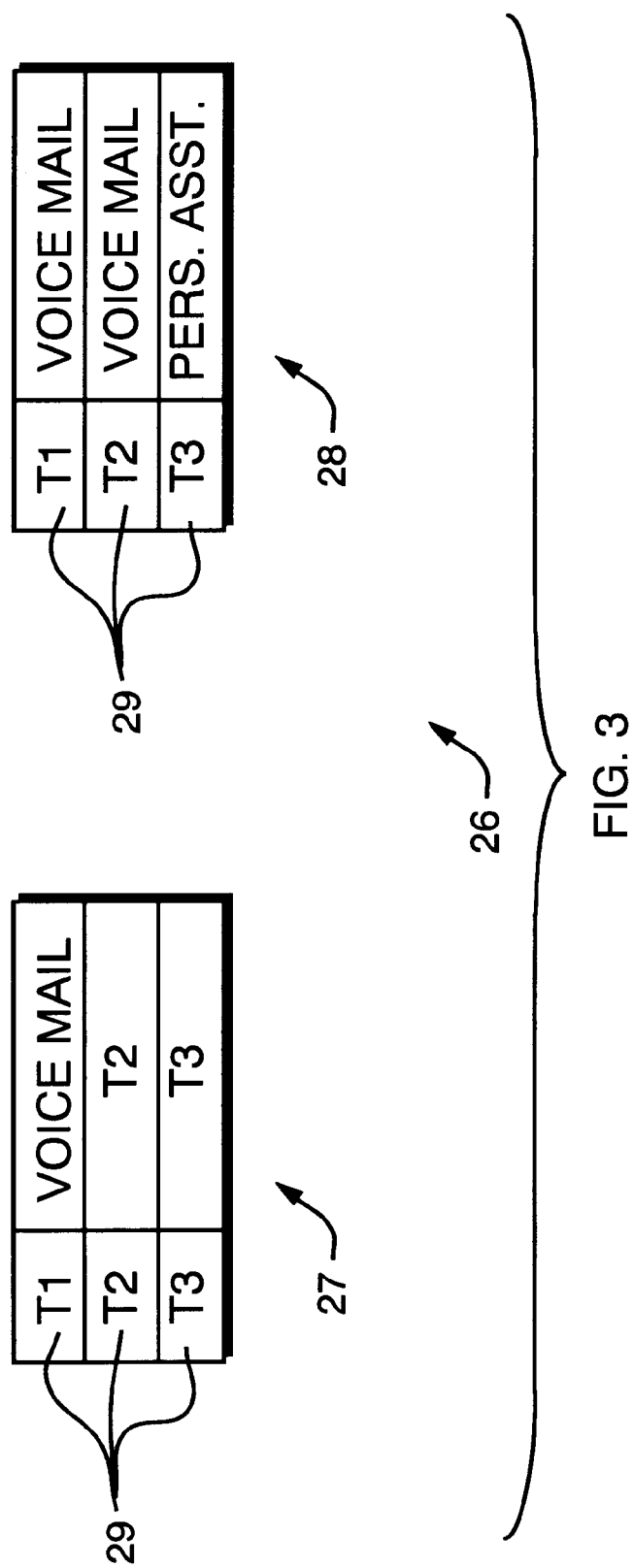
FIG. 3 is a schematic diagram of a call management database generated and maintained by the system of FIG. 1.

The call management database 26 is preferably in the form of a pair of association or look-up tables 27 and 28 (FIG. 3). The association tables comprise plural address lines 29, each of which provides a segment to link a terminal end-point with a corresponding network-resident service node 18. In the embodiment shown, the first association table 27 defines an initial call presentation table and provides links for each terminal end-point to appropriate end-points, whether they are to the end-point 20 itself or to a service node 18. The second association table 28 defines an unavailable terminal table, and provides links for each terminal end-point to the appropriate service node. Thus, the first association table is preferably accessed before an incoming call is routed to the corresponding terminal end-point 20 to determine whether a service node has been selected to receive all incoming calls directed to that terminal end-point. For example, the user at the terminal end-point may select to temporarily have all incoming calls routed to one of the service nodes so that he or she is not disturbed. Thus, the first table is dynamic and will change often. The second table is preferably accessed only after a call has been presented to a terminal end-point, and the terminal end-point fails to connect with the call within a predetermined period of time.

As shown in FIG. 3 as an example, the terminal end-point T1 is linked in the first association table 27 with the voice mail platform of the service node 18. As such, until that association for T1 is changed, all incoming calls directed to T1 are routed directly to the voice mail platform of the service node, and are not presented at the terminal T1 itself. T1 is also linked in the second association table 28 with the voice mail platform of the service node. Thus, once the association in the first association table is changed for T1, any calls presented to T1 that are not answered within a predetermined period of time will be routed to the voicemail platform of the service node 18.

As shown in FIG. 3, the first association table 27 does not link terminal end-point T2 with any service node, but rather with itself. Thus, incoming calls for T2 are routed to T2 and are initially presented there. The second association table 28 links T2 with the voice mail platform of the service node 18. Thus, any calls presented to T2 that are not accepted by T2 within some preselected period of time are routed to voice mail. Similarly, calls to T3 will be routed to T3 and, if not answered, will be routed to a personal assistant subsystem of the service node, as dictated by the associations for T3.

The entries in the first association table 27 are dynamic and may be changed frequently. For example, when a user at a terminal is about go off-line, he or she may select to have all incoming calls routed to a personal assistant service node, a call forwarding service node, or other well known type of service node. Such information is received by the CCSE and is stored in the appropriate field in the first association table 27. When the user is back on-line, he or she may select to be presented with all incoming calls. This information is received by the CCSE, which updates the appropriate field in the first association table.

While in the embodiment disclosed there are two discrete association tables 27 and 28, it will be understood by those of ordinary skill in the art that one association table may alternatively be used, which includes the various links for each terminal end-point 20.

The network-resident service node 18 is operative to receive incoming calls routed by the CCSE 16 and provides an appropriate service to handle the incoming call. The service may be a conventional voice mail service, a personal assistant service, call forwarding service, or the like. The service node preferably includes a multi-point controller 34 (MC) that supports multi-party conferences (FIG. 2). The service node further includes service logic 36, an external service access manager 38, a multi-thread interface 40, and plural H.323 stacks 41. The primary communication path between the CCSE and the service node is H.323 signaling between the respective stacks. The CCSE and service node each include multiple stacks, with one stack from each being paired to accommodate a particular incoming call. Thus, multiple calls may be handled at any time. The multi-thread interface connects the multiple stacks with the service logic device, so that the service logic device may simultaneously process multiple incoming calls. Alternatively, the system 10 could use a multiple process device, in which each incoming call is processed by one of the processes.

The CCSE 16 and service node 18 are preferably interconnected by means of a common object request broker architecture (CORBA) based data access utility 42 including plural CORBA interfaces 43. As is well known to those skilled in the art, CORBA is a communication protocol that allows two or more different components to communicate with each other. Thus, in the preferred embodiment the CORBA-based data access utility serves as the distributed object mechanism between the feature selector and service node to support communication therebetween. Alternatively, other mechanisms may be used, such as Distributed Component Object Model (D/COM), Distributed Computing Environment (DCE), and Remote Procedure Call (RPC).

It will be apparent to those skilled in the art that the service logic 36 of the service node 18 will vary depending on the type of service being offered. For example, in the case of a voice mail service, the service logic includes code for playing a prerecorded digital or analog message, preferably a message recorded by the user of the terminal end-point being called. After the message, service logic accepts input from the caller, and stores the message for future playback when the user of the called terminal end-point accesses the voice mail subsystem of the service node. In the case of a personal assistant (or automated attendant), the service logic provides the caller with plural options, such as call forwarding, voice mail, and the like. Depending on the option selected, the call is either routed to another terminal end-point, or the device accepts input in the form of a voice message, all of which is well known to those of ordinary skill in the art.

The terminal end-points 20 are H.323 defined entities and include both input and output equipment for supporting video and audio. Preferably, the terminals include graphical user interfaces (GUIs) for presenting line appearances in various formats, as is described in more detail below.

The special features of the network system 10 of the present invention are implemented, in part, by software programs stored in memory. The software programs are accessible by the components of the system, the function of which is described in greater detail in connection with FIGS. 5 and 6.

Figure 6:
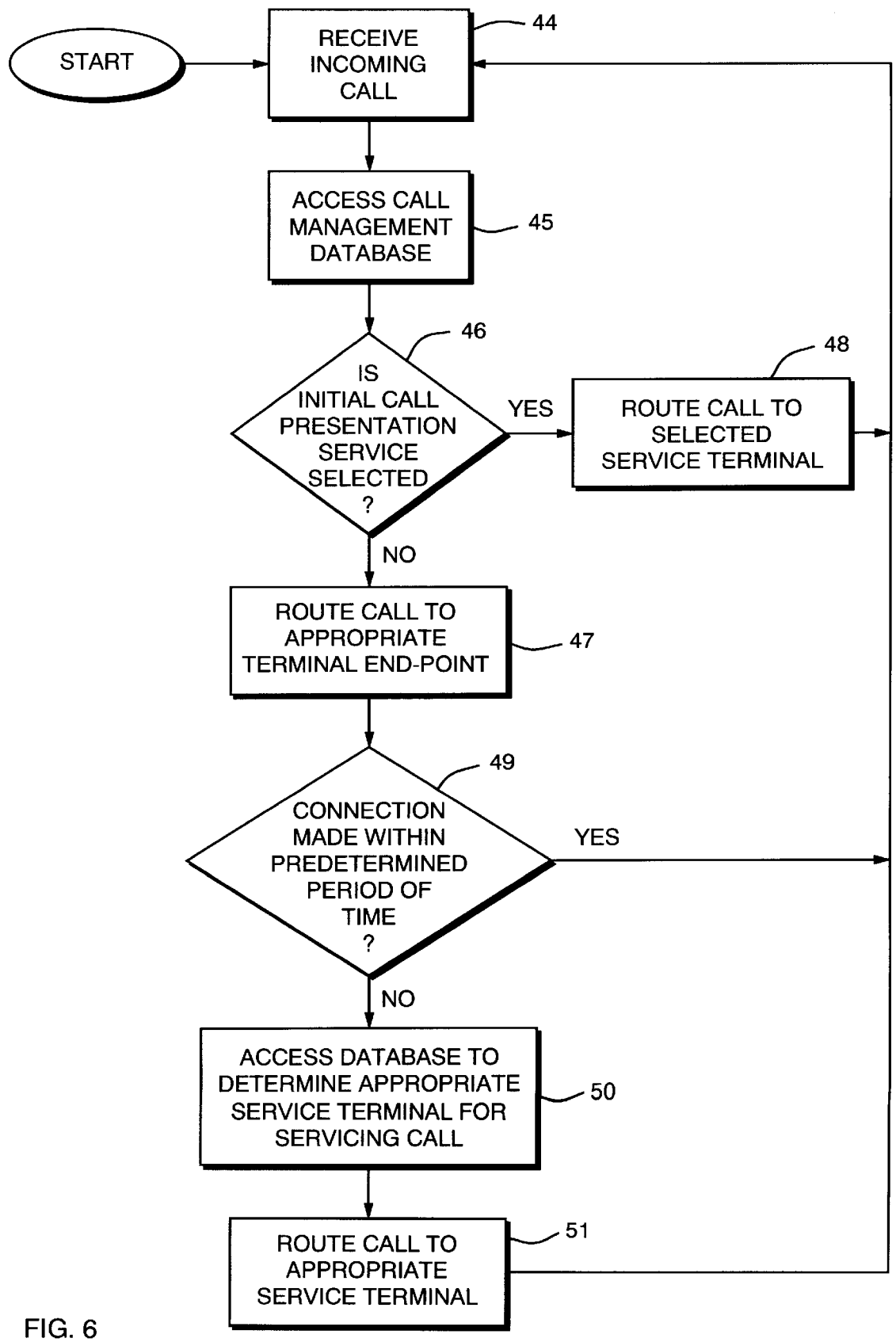
FIG. 6 is a flow chart depicting the operational flow of the systems of FIGS. 1 and 4.

Referring now to FIGS. 1 and 6, one preferred method of the present invention will be described. A call placed by a user on the PSTN 22 is transmitted to the gateway 12. Initially, the gateway performs the necessary translation into the H.323 format. Next, the translated signal is transmitted to the gatekeeper 14, which receives the signal and performs the access control function in order to authorize the call from the caller. Possible reasons for rejection may include restricted access to or from particular terminals or gateways, restricted access during certain time periods, and the like.

Assuming that the caller is authorized, operation proceeds and the gatekeeper 14 directs the gateway 12 to establish a signaling path directly to the signal routing device, in this case the CCSE 16. The CCSE receives the logical address for the call, such as a specific E. 164 address, at step 44. The CCSE then accesses a database and uses the logical address to determine the corresponding terminal IP address. In a preferred embodiment, the feature selector 24 then accesses the first association table 27 of the call management database 26 at step 45. The feature selector searches the first association table for the address line 29 corresponding to the called terminal end-point 20 to determine whether a service node has been linked with that terminal end-point for initial call presentation, at step 46. If no service node is linked with the terminal end-point in the first association table, then operation proceeds to step 47, and the call is routed to the terminal end-point and presented to the user. If, on the other hand, a service node is linked with the terminal end-point in the first association table, operation instead proceeds to step 48, and the call is routed to the appropriate network-resident service node end-point which handles the incoming call and provides one or more service options to the caller, as described above. In that event, operation then proceeds back to step 44, and the system 10 handles the next incoming call.

If the call is routed to the terminal end point, operation flows to step 49, and the CCSE 16 monitors whether the call is accepted by the terminal end-point 20. For example, the CCSE may monitor whether an alert or connect signal is received from the terminal end-point within a predetermined period of time. If so, the call is connected, operation flows back to step 44, and the system 10 handles the next incoming call. If the call is not accepted within a predetermined period of time, for example ten seconds, operation proceeds to step 50, and the feature selector 24 is operative to access the second association table 28 of the call management database 26 to determine the appropriate service node to handle the call. Such determination is made by simply finding the address line 29 (FIG. 3) corresponding to the appropriate terminal end-point in the second association table, and determining the corresponding service node that is linked to that terminal end-point. Operation then flows to step 51, and the incoming call is routed by the CCSE to the appropriate service node. Operation then proceeds back to step 44, and the system handles the next incoming call.

Figure 4:
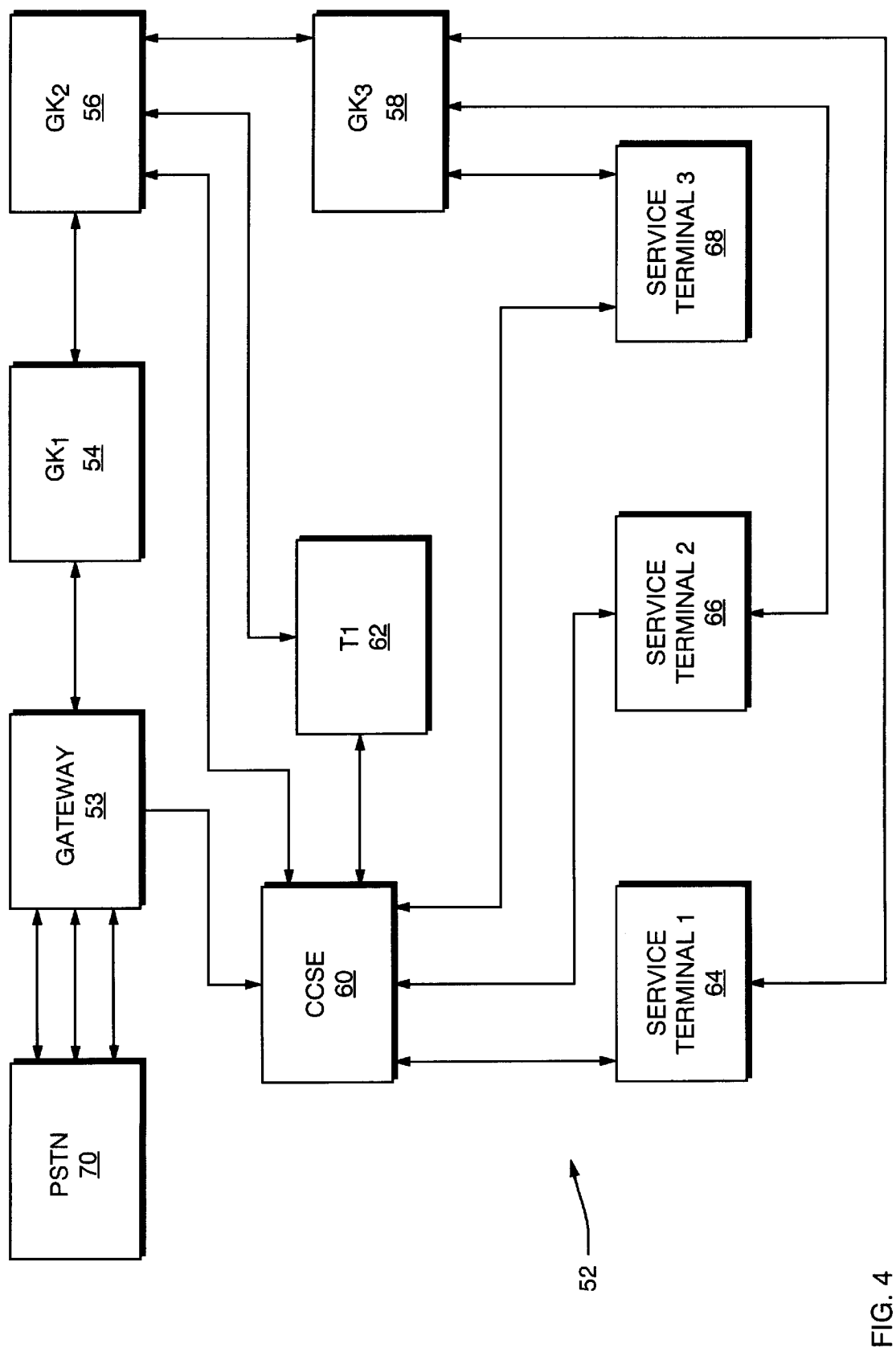
FIG. 4 is a block diagram of an alternative embodiment of the system of the present invention.

Referring now to FIG. 4, there is shown a second embodiment of the network system 52 of the present invention. The network system comprises a gateway 53, plural gatekeepers 54, 56, and 58, a CCSE 60, at least one terminal end-point 62, and plural network-resident service nodes 64, 66, and 68. The gateway 53 is in communication with a PSTN 70 for two-way communication therebetween, as described above in connection with the first described embodiment. Alternatively, instead of being in communication with the PSTN, the gateway could be in communication with another PBN or with some other SCN.

The first gatekeeper 54 is in communication with the gateway 53 to receive, for example, the translated E.164 address from the gateway. The first gatekeeper 54 is operative to multicast a location request to plural gatekeepers (only the affirmatively responding gatekeeper 56 is shown in FIG. 4) to locate the gatekeeper that services a particular dialed number, as is described in greater detail below.

The CCSE 60 is also connected to the gateway 53 for communication therewith, as well as with the affirmatively responding gatekeeper 56. The CCSE serves as the signal routing agent for the call signals, and communicates directly with the gateway. As with the previous embodiment, a call routing gatekeeper can be used in the place of the CCSE. The CCSE is also in communication with the terminal end-point 62 ("T1"), and with the plural network-resident service nodes 64, 66, and 68.

The second gatekeeper 56 is also in communication with T1, and with a third gatekeeper 58. The third gatekeeper, in turn, is connected with the various network-resident service nodes 64, 66, and 68.

Figure 5:
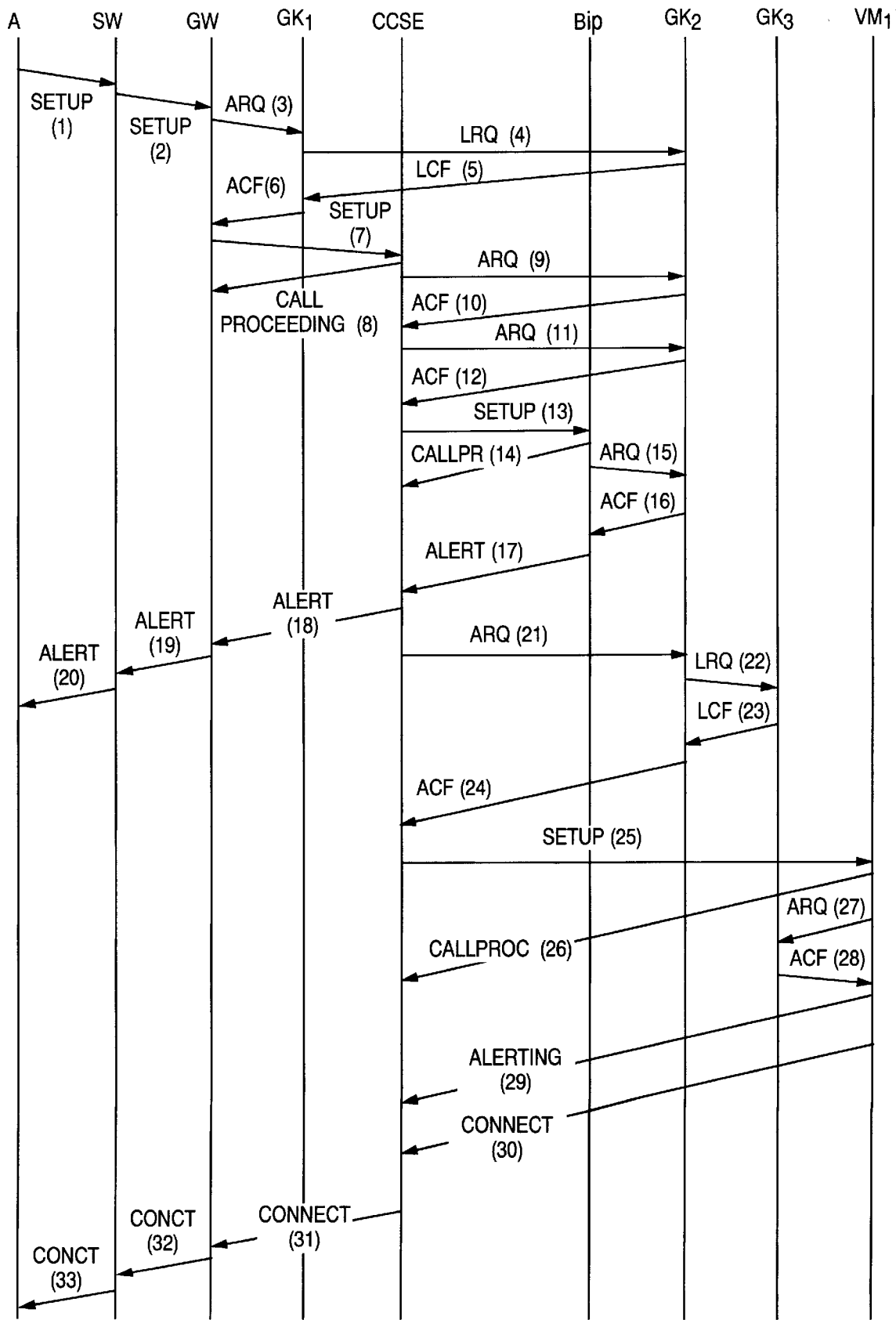
FIG. 5 is a timing diagram for the signaling sequence of the system of FIG. 4.

Referring to FIG. 5, there is shown a timing diagram for the signaling involved according to one embodiment of the present invention. The signaling functions in one illustrative embodiment use H.323/Q.931 protocol. Initially, an outgoing call placed from a telephone device A in, for example, the PSTN is transmitted as a Setup (1) signal through the PSTN switching network (SW), and to the gateway 53 as a Setup (2) signal. The gateway then transmits an admission request (ARQ) signal ARQ (3) that is received by the first gatekeeper 54. The first gatekeeper is then operative to multicast a location request (LRQ) signal LRQ (4) to locate the gatekeeper that services the number dialed at the telephone device A. The second gatekeeper 56, which services the number dialed, then transmits a location confirmation (LCF) signal LCF (5) back to the first gatekeeper 54, informing the first gatekeeper as to the location of the corresponding terminal end-point. The first gatekeeper then transmits an admission confirmation (ACF) signal ACF (6) to the gateway 53 with the IP address of the corresponding signal routing agent, in this case the CCSE 60, that services the number dialed. The ACF (6) signal also serves to direct the gateway to establish a direct signaling path to the CCSE.

The gateway 53 then transmits a Setup (7) signal to the CCSE 60, corresponding to step 44 in FIG. 6. The CCSE responds with a Call Proceeding (8) signal transmitted back to the gateway. The CCSE then transmits an ARQ signal ARQ (9) to the second gatekeeper 56 requesting to communicate with the terminal end-point T1 or "Bip". The second gatekeeper 56 then transmits an ACF signal ACF (10) back to the CCSE authorizing the CCSE to communicate directly with the end-point T1. A second ARQ (11) signal is transmitted by the CCSE to the second gatekeeper, which responds with a second ACF (12) signal. The first ARQ signal ARQ (9) is an admissions check for the incoming call, and the second ARQ signal ARQ (11) is an attempt to map an H.323 alias, determined from the information input by the calling party, to an IP address in order to complete the call.

The CCSE then transmits a setup signal Setup (13) to T1, which in one preferred embodiment appears in the form of a line appearance at the graphical user interface ("GUr") of T1. T1 transmits a CallProceeding (14) signal back to the CCSE to inform the CCSE that the call is being placed. The terminal end-point T1 then transmits an ARQ signal ARQ (15) to the second gatekeeper 56. The gatekeeper responds with an ACF signal ACF (16), which includes the call signaling channel transport address of the CCSE. The end-point T1 then transmits an alert signal Alert (17) directly to the CCSE indicating that the call is proceeding and is being presented at terminal end-point T1. Respective alert signals Alert (18), Alert (19), and Alert (20) are transmitted through the gateway 53 and PSTN 70 to the caller's telephone device A.

The CCSE 60 is then programmed to wait for a predetermined period of time for the terminal end-point T1 to accept the call, corresponding to step 49 in FIG. 6. If, after the predetermined amount of time has elapsed, the CCSE has not received a connect signal from the terminal end-point, the feature selector 24 is programmed to access the second association table 28 to determine the corresponding service node linked to T1, corresponding to step 50 in FIG. 6. Assuming the service node comprises the voice mail terminal $VM_1$, the CCSE then transmits an appropriate ARQ signal ARQ (21) to the second gatekeeper 56. The second gatekeeper then transmits a LRQ signal LRQ (22), which is responded to by the third gatekeeper 58 in the form of a LCF signal LCF (23), which informs the second gatekeeper as to the location of the corresponding service node. The second gatekeeper then transmits an admission confirmation (ACF) signal ACF (24) to the CCSE 60 with the IP address of the corresponding network-resident service node. The ACF (24) signal also serves to direct the CCSE to establish a direct signaling path to $VM_1$. The CCSE then communicates directly with $VM_1$ in the form of a Setup (25) signal, corresponding to step 51 in FIG. 6. $VM_1$ responds with a CallProceeding (26) signal back to the CCSE, and transmits an ARQ (27) signal to the third gatekeeper 58. The third gatekeeper transmits a corresponding ACF (28) signal to $VM_1$, which responds with an Alert (29) signal to the CCSE 60, followed by a Connect (30) signal which is received by the CCSE. The CCSE then transmits a Connect (31) signal to the gateway 53, which sends Connect (32) signal to the PSTN switch SW, which in turn transmits a Connect (33) signal to the caller's communication device, thereby establishing a communication channel between the caller and $VM_1$.

In a preferred embodiment, before the ARQ (9) signal is transmitted by the CCSE 60, the feature selector 24 accesses the first association table 27 of the call management database 26 to determine whether the terminal end-point T1 is linked with a service node for initial call presentation. If so, the next signal transmitted is the ARQ (21) signal to the second gatekeeper 56. If not, the signaling proceeds as shown in FIG. 5 and as described above.

The system 10 of the present invention in one illustrative embodiment may be incorporated in a hierarchical communications network, as is disclosed in co-pending U.S. Pat. application Ser. No. 60/105,326 (Attorney Docket Number 98–808) of Gardell et al. entitled "A HIGH SPEED COMMUNICATIONS SYSTEM OPERATING OVER A COMPUTER NETWORK", and filed on Oct. 23, 1998 the disclosure of which is incorporated herein by reference. Thus, the various network-resident service capabilities disclosed herein may be implemented in a nationwide or even worldwide hierarchical computer network.

From the foregoing, it will be apparent that the network system 10 of the present invention modifies existing H.323-based communications systems to provide a network presence in the event a terminal end-point is unavailable, and provides various services at the network level rather than at the client level.

While the invention has been particularly shown and described with reference to preferred embodiments thereof, it will be understood by those skilled in the art that various changes in form and details may be made therein without departing from the spirit and scope of the invention.

We claim:

1. A communication system for interacting with a switched circuit network and for providing network-based services for handling incoming calls directed to at least one terminal end-point, the system comprising:

a gateway in communication with the switched circuit network, the gateway being operative to translate switched circuit network-compatible signals into computer network-compatible signals;

an association table configured to store a routing address corresponding to the terminal end-point, the routing address identifying a preselected one of the terminal end-point and a network-resident service terminal;

a signal routing agent in communication with the gateway, with the terminal end-point, and with one or more network-resident service terminals, the signal routing agent being operative to receive an incoming call from the gateway addressed to the terminal end-point; and a feature selector in communication with the signal routing agent and the association table, the feature selector being programmed to determine a routing address for the incoming call using the association table and to instruct the signal routing agent to route the incoming call based on the routine address.

2. The system of claim 1, wherein:

the signal routing agent is programmed to notify the feature selector upon receipt of the incoming call.

3. The system of claim 1 wherein:

the feature selector is responsive to receipt of an incoming call addressed to one of the terminal end-points to access the association table to identify one of the network-resident service terminals to receive the incoming call, and to signal the signal routing agent to route the incoming call to the identified network-resident service terminal.

4. The system of claim 1 wherein:

the gateway and signal routing agent are constructed to operate under an H.323 standard.

5. The system of claim 1 wherein:

the signal routing agent comprises a call routed gatekeeper.

6. The system of claim 1 wherein:

the signal routing agent comprises a call control service entity.

7. The system of claim 6 wherein:

the call control service entity comprises the feature selector and the association table.

8. A system for use in a packet based network, the packet based network including one or more terminal end-points and one or more network-resident service nodes, the system comprising:

a call management database configured to store a routing address corresponding to each of the terminal end-points, the routing address identifying a preselected one of the corresponding terminal end-points and one of the service nodes;

a service feature selector programmed to access the call management database upon notification of an incoming signal directed to one of the terminal end-points to determine a destination to receive the incoming signal based on routing address; and a signal routing agent in communication with the service feature selector, the signal routing agent being operative to receive incoming signals and to route the incoming signals to appropriate destinations as directed by the service feature selector.

9. The system of claim 8 wherein:

the service feature selector is further programmed to access the call management database to identify one of the service nodes for a terminal end-point in the event the terminal end-point is unavailable.

10. The system of claim 8 wherein:

the signal routing agent is responsive to receipt of an incoming signal to notify the service feature selector; and the service feature selector is responsive to receipt of the notification to access the call management database to determine the appropriate destination to receive the incoming signal.

11. The system of claim 8 wherein:

the signal routing agent comprises a call control service entity.

12. The system of claim 11 wherein:

the call control service entity comprises the service feature selector and the call management database.

13. The system of claim 8 wherein:

the signal routing agent comprises a call routed gatekeeper.

14. The system of claim 8 wherein:

the call management database is in the form of an association table.

15. The system of claim 8 wherein:

the signal routing agent is constructed to operate under an H.323 standard.

16. A method for providing network-resident communication services in a packet based network, comprising the steps of:

receiving an incoming call addressed to a particular terminal end-point in the packet based network;

determining whether to send the incoming call to the terminal end-point or one of a plurality of network-resident service nodes based on predetermined data;

sending the incoming call to the network-resident service node when the predetermined data identifies the network-resident service node;

sending the incoming call to the terminal end-point when the predetermined data identifies the terminal end-point;

determining whether the terminal end-point is available to receive the incoming call;

if the terminal end-point is not available, identifying one of the network-resident service nodes to receive the incoming call; and routing the incoming call to the identified network-resident service node.

17. The method of claim 16 wherein the step of determining whether the terminal end-point is available comprises routing the incoming call to the terminal end-point and monitoring whether the terminal end-point responds to the incoming call within a preselected time period.

18. The method of claim 16 wherein the step of determining whether to send the incoming call to the terminal end-point or the network-resident service node comprises accessing a call management database to check if the network-resident service node has been selected to receive incoming calls directed to the terminal end-point.

19. A method for providing network-resident communication services in a packet based network, comprising the steps of:

receiving an incoming call addressed to a particular terminal end-point;

accessing a call management database to determine whether the terminal end-point is linked with a corresponding service node for initial call presentation;

if the terminal end-point is linked with the service node for initial call presentation, routing the incoming call to the service node; and if no service node is linked with the terminal end-point, routing the incoming call to the terminal end-point.

20. The method of claim 19 and further including the steps of:

after the incoming call has been routed to the terminal end-point, determining whether the terminal end-point is unavailable;

if the terminal end-point is unavailable, accessing the call management database to determine the appropriate service node to receive the incoming call; and routing the incoming call to the appropriate service node.

21. The method of claim 20 wherein the step of determining whether the terminal end-point is available comprises monitoring whether the terminal end-point responds to the incoming call within a selected period of time.

* * * * *